United States Patent
Globuschutz

[11] Patent Number: 5,870,667
[45] Date of Patent: Feb. 9, 1999

[54] SUPPORT SYSTEM ARCHITECTURE FOR USE IN A COMMUNICATIONS NETWORK ENVIRONMENT ENABLING AUTOMATIC PROVISIONING, CHANGE IN SERVICE AND MAINTENANCE

[75] Inventor: Mark J. Globuschutz, Louisville, Colo.

[73] Assignees: MediaOne Group, Inc., Englewood; US West, Inc., Denver, both of Colo.

[21] Appl. No.: 662,252

[22] Filed: Jun. 14, 1996

[51] Int. Cl.[6] .................................................. H04Q 7/20
[52] U.S. Cl. ..................... 455/67.1; 455/423; 455/456; 455/408
[58] Field of Search .................................. 455/67.1, 8, 9, 455/92, 456, 457, 507, 508, 521, 560, 517, 423, 408, 425; 379/27, 29

[56] References Cited

U.S. PATENT DOCUMENTS

| | | | |
|---|---|---|---|
| 5,122,959 | 6/1992 | Nathanson et al. | 340/993 |
| 5,148,472 | 9/1992 | Freese et al. | 455/408 |
| 5,235,633 | 8/1993 | Dennison et al. | 455/456 |
| 5,285,494 | 2/1994 | Sprecher et al. | 455/508 |
| 5,570,412 | 10/1996 | LeBlanc | 455/456 |
| 5,706,333 | 1/1998 | Greening et al. | 455/67.1 |

*Primary Examiner*—Edward F. Urban
*Assistant Examiner*—Thuan Nguyen
*Attorney, Agent, or Firm*—Brooks & Kushman, P.C.

[57] ABSTRACT

A support system architecture for use in a communications network environment enabling automatic provisioning, change in service, and maintenance at a plurality of subscriber locations. A gateway allows communication between a plurality of programmer providers and a network provider including status information for each of the plurality of subscriber locations. A customer management system in communication with the gateway determines whether service at a subscriber location can be remotely provisioned or changed based on the status information. A service control manager in communication with the customer management system automatically provisions or performs a change in the service of the subscriber location if the service of the subscriber location can be remotely provisioned or changed. A dispatch system in communication with the customer management system automatically schedules work activity to provision the subscriber location or perform a change in service at the subscriber location if the service of the subscriber location cannot be remotely provisioned or changed. A network status monitoring system is also provided in communication with the dispatch system and a plurality of network elements for monitoring a status of each of the network elements and automatically notifying the dispatch system of any faults detected in the network elements.

15 Claims, 2 Drawing Sheets

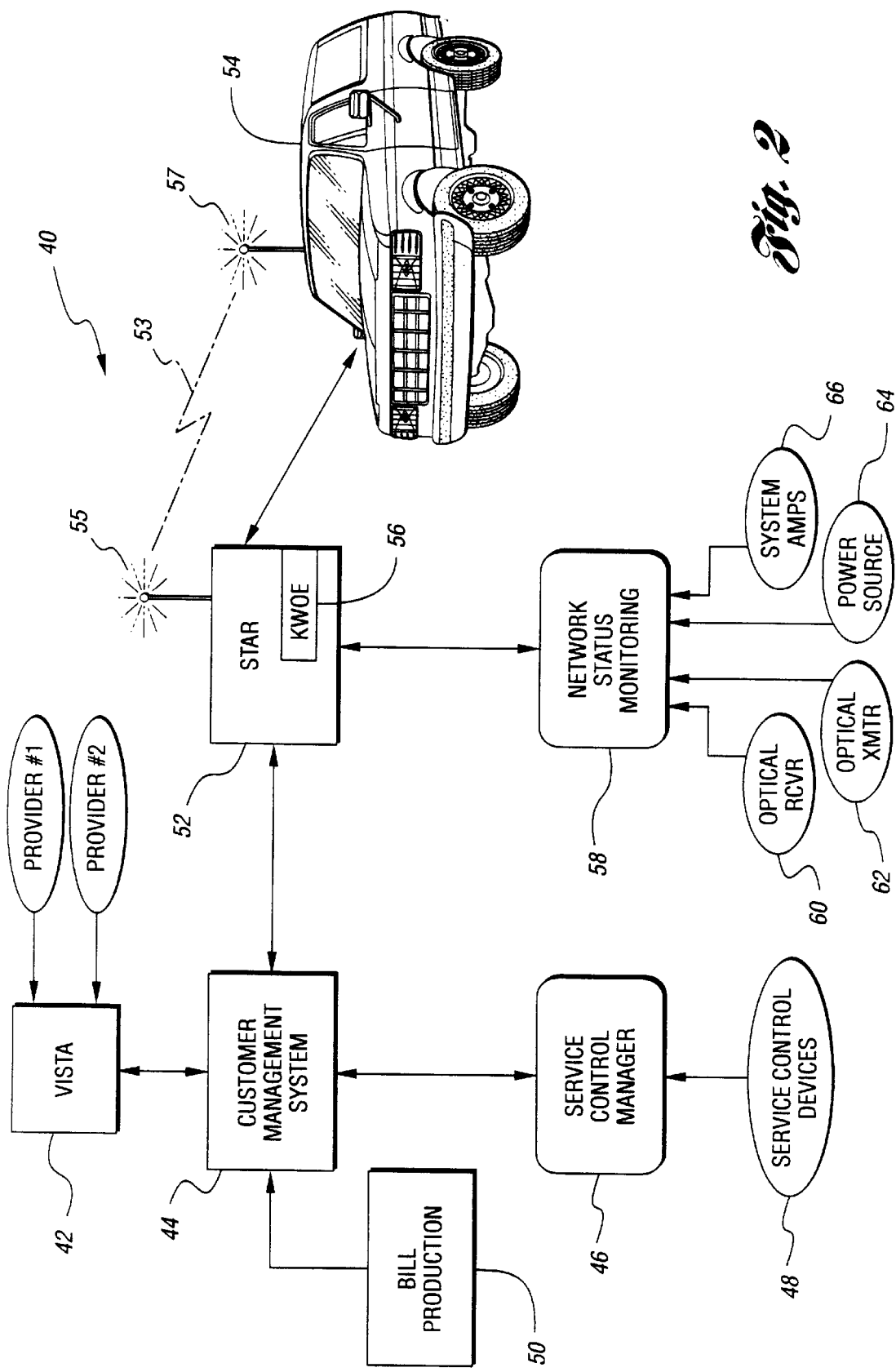

SUPPORT SYSTEM ARCHITECTURE FOR USE IN A COMMUNICATIONS NETWORK ENVIRONMENT ENABLING AUTOMATIC PROVISIONING, CHANGE IN SERVICE AND MAINTENANCE

TECHNICAL FIELD

This invention relates to support system architectures and, more particularly, to an operational support system architecture for video and related services enabling provisioning, maintenance and service changes on a flow through basis.

BACKGROUND ART

Telecommunications networks have become essential to the day-to-day activities of the enterprise and individuals. Many corporations, agencies, universities, and other institutions now rely on voice, data, and video services to ensure their growth and survival. This trend continues to accelerate as personal communications services (PCS), LAN-to-LAN interconnectivity, image file transfer, and other innovative services are developed and are standardized throughout the operation of the enterprise.

Network management is an important part of telecommunications. It includes operations, administration, maintenance, and provisioning functions required to provide, monitor, interpret, and control the network and the services it carries. These functions provide operating telephone companies and their corporate customers and end users with efficient means to manage their resources and services to achieve objectives. There are many different approaches and strategies taken by operating telephone companies, equipment vendors, and users to manage their networks and equipment. Management solutions are often specific to each vendor's networking product environment.

A known prior art network management architecture consists of two layers, the Operational Support System (OSS) layer and an elemental layer. The elemental layer consists of units that implement management commands, detect problems and provide autonomous activities (e.g., protection switching, diagnostics, etc.). This architecture, however, has many disadvantages. First, new elements cannot be added to the network without requiring system changes to support the functionality that the elements offered. Second, changes in the systems that are required to accommodate the addition of new elements are slow to develop due to their size and complexity. Changes have to be prioritized with other changes that are determined to be equally important or critical which delay the introduction of the element capabilities. System changes are expensive and require extensive testing to determine the impact of the change on other system features or element support functions. Third, replacement of the systems is difficult because of the many unique, customized functions that the systems perform for the elements. The only effective replacement for a system is a system that acts the same as the system being replaced.

In developing a network management architecture that overcomes the inefficiency, costliness, and complexity of an existing environment, it is essential to address key service, technical, and business aspects. Key service aspects include enabling rapid new service deployment within both the network and network management system environments and promoting faster service activation. Management or operations systems must be flexible and have a distributed, modular architecture that allows service providers to adapt to future customer needs.

Key business aspects include reducing operations costs, enhancing the flexibility of the operations, administration, maintenance and provisioning environment, and providing services in a competitive, timely manner. Cost reduction can be addressed by simplifying the network, integrating and simplifying operations processes and functions, eliminating redundant databases. Flexibility can be enhanced by incorporating more intelligence into network elements so as to create a functionally based structure that addresses a variety of services and technologies.

Thus, a need exists for a configuration, accounting, service and network management architecture that integrates provisioning, maintenance and change in service functions with network status monitoring and field technician work assignments which enables system changes reflecting service needs and changes to be implemented quickly with reduced expenses and complexity.

DISCLOSURE OF THE INVENTION

It is a general object of the present invention to provide a support system architecture that integrates provisioning, maintenance and change in service functions with network status monitoring and field technician work assignments.

It is another object of the present invention to provide a support system architecture that enables a third party service provider to manage the delivery of their services at end user locations without involvement of representatives of the network provider.

It is yet another object of the present invention to provide a support system architecture that facilitate service orders with a flow through process that is totally mechanized having little human involvement.

It is a further object of the present invention to provide a support system architecture that allows network problems to be identified and resolved before they affect service or before the customer is aware there is a problem.

In carrying out the above objects of the present invention, a support system architecture is provided for enabling automatic provisioning and change in service at a plurality of subscriber locations. The architecture includes a gateway for allowing communication between a plurality of programmer providers and a network provider including status information for each of the plurality of subscriber locations. The architecture also includes a customer management system in communication with the gateway for determining whether service at one of the plurality of subscriber locations can be remotely provisioned or changed based on the status information. The architecture further includes a service control manager in communication with the customer management system and the plurality of subscriber locations for automatically provisioning or changing the service of one of the plurality of subscriber locations if the service of the one of the plurality of subscriber locations can be remotely provisioned or changed. Still further, the architecture includes a dispatch system in communication with the customer management system for automatically scheduling work activity to provision the one of the plurality subscriber locations or perform a change in service of the one of the plurality of subscriber locations if the service of the one of the plurality of subscriber locations cannot be remotely provisioned or changed.

In further carrying out the above objects of the present invention, an architecture is also provided for enabling automatic maintenance service at a plurality of subscriber locations. The architecture includes a network status monitoring system in communication with a plurality of network elements for monitoring a status of each of the plurality of network elements. The architecture further includes a dispatch system in communication with the network status monitoring system for automatically scheduling work activity to perform maintenance on the plurality of network elements based on the status of each of the plurality of network elements.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 2 is a schematic block diagram of the system architecture of the present invention.

BEST MODES FOR CARRYING OUT THE INVENTION

Figure 1:
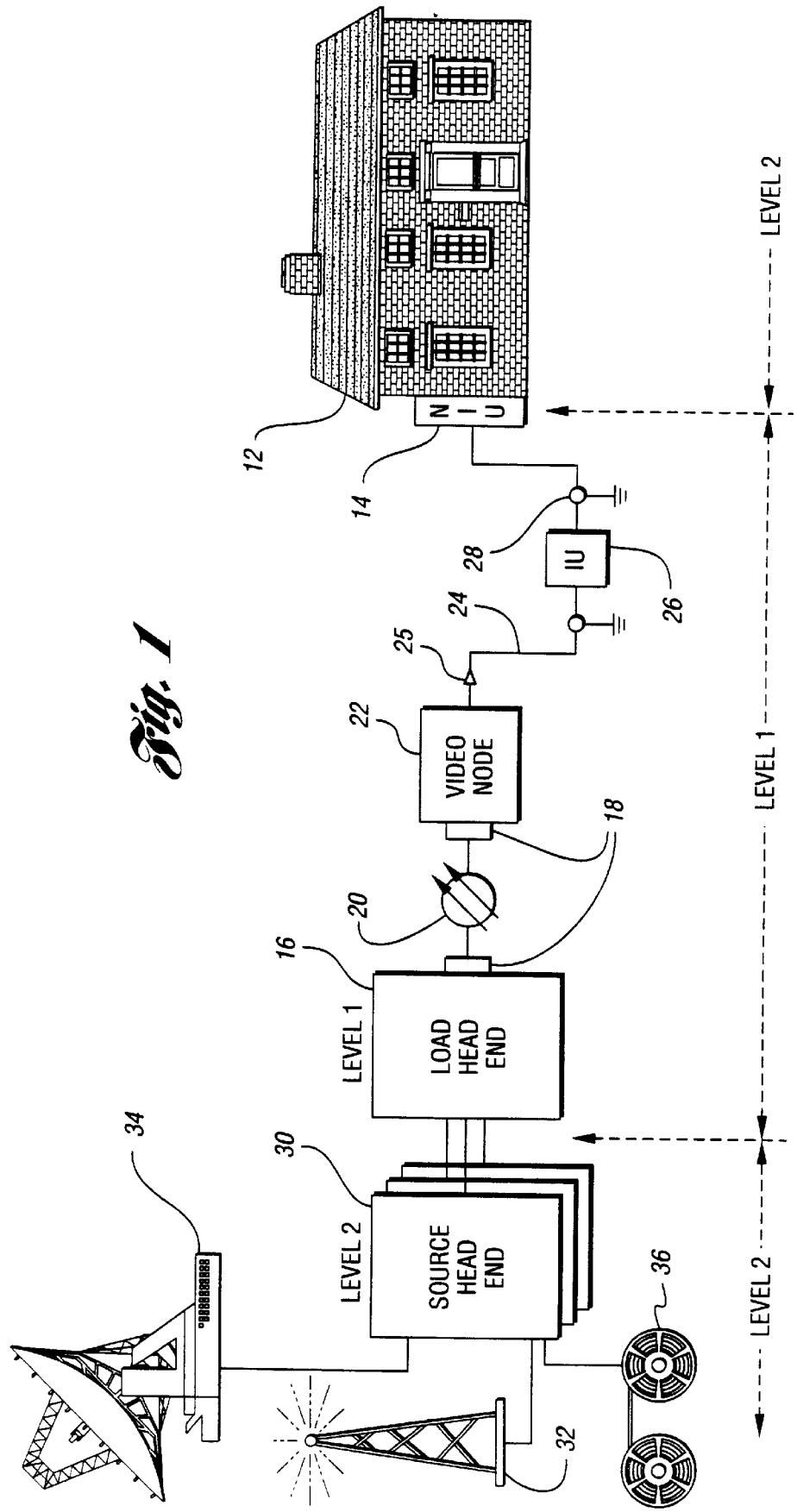
FIG. 1 is a schematic diagram of a video dial tone environment in which the present invention is utilized.

Turning now to FIG. 1, there is shown a schematic diagram of a video dial tone environment in which the present invention is utilized. The architecture of the present invention may also be used in other environments, such as telephony. Under the FCC (Federal Communications Commission) Video Dial Tone regulations, a telecommunications network provider is classified as a Level 1 provider. The telecommunications network provider is restricted to providing common carriage of video services over a distribution network. The Level 1 network service originates at a point from which video signals are received from Level 2 programmer providers and extends to a business or residence 12 where it terminates in a Network Interface Unit (NIU) 14.

The Level 1 network consists of a load head-end 16, at least one optical transmitter and receiver 18, fiber transport 20, at least one video node 22, coaxial cable 24, system amplifiers 25, at least one service control unit 26, coaxial drops 28 and the NIU 14. A set-top box (not shown) could also be used in place of the interdiction unit 26. The load head-end 16 differs from a typical cable company head-end and becomes involved in service delivery when baseband video signals are received from the programmer providers. The load head-end 16 modulates video signals to specific channels, combines the video signals and applies the video signals to the distribution network.

The video node 22 is a point at which video signals are converted from optical transmission to RF (Radio Frequency) transmission. The service control unit 26 jams certain channels and transmits only those which the end user has subscribed to.

The Level 2 programmer providers each consists of a source head-end 30, which receives off-air reception through an antenna 32, satellite reception through a satellite receiver 34, and provides originated programming, for example, via a tape reel 36. The source head-end 30 also performs associated demodulation and processing functions.

In the regulated environment, Level 1 is the network provider and their customers are the Level 2 programmer providers. Level 1 does not have a direct relationship with the end user customer, which is the customer of the Level 2 programmer providers. However, the location does represent the termination point of the Level 1 network. To facilitate the identification of the location by something other than a street address, each termination point is assigned a Subscriber Location Identifier number (SLID). The SLID is permanently assigned to the location and remains the same regardless of the resident at the location.

By repositioning network databases to take advantage of intelligent network elements, providing high-level standard interfaces, implementing standard protocols and messages, and sharing operations, administration, maintenance and provisioning functionality across operations systems and intelligent network elements, the network will enable network/service providers to rapidly deploy new services, implement innovative technologies, reduce costs, enhance competitiveness, and meet the ever-increasing demands of customers. The architecture of the present invention utilizes a telecommunications management network (TMN) framework, established by the International Telecommunications Union-Telecommunications (ITU-T), which defines the relationship between basic network functional building blocks (i.e., operations systems, data communications networks, and network elements) in terms of standard interfaces.

The architecture of the present invention is a four layer architecture made up of Service Management, Network Management, Elemental Management, and element layers. The Service Management Layer (SML) consists of functions associated with customer contact, service usage measurements, quality of service measurements, and translation of the customer's description of a service to the network configuration necessary to present or support the service.

The Elemental Management Layer (EML) consists of Elemental Managers that manage each network element on an individual basis. The EML provides control and coordination of a group of network elements, provides a gateway to the elements for the Network Management Layer (NML), and maintains statistics and history pertaining to individual elements. Elemental Managers maintain a proprietary interface between the EML and the elements allowing a vendor the capability of introducing new and innovative capabilities with their elements and requiring little or no change in the NML.

The NML is capable of managing many Elemental Managers from multiple vendors over a wide geographical area. The NML has complete visibility of the network, nodes and links and is responsible for the growth, modification and salvage of network resources. The NML can process data generated from the Elemental Managers and allow the EML to perform those functions that are unique to the vendor element structure or capabilities. With the intelligence capabilities of the Elemental Managers, functions such as alarm consolidation or root cause analysis can be performed by the EML, and a single message regarding the network condition can be delivered to the NML.

The interface between the EML and the NML is intended to be open. A vendor's Elemental Manager and elements can be introduced into a network without requiring major changes to the Network Layer system. Different vendor elements may also be introduced into the same network, introducing new capabilities, without requiring changes in the network layer.

Turning now to FIG. 2, there is shown a schematic block diagram of the architecture of the present invention, denoted generally by reference numeral 40. The architecture 40 includes a gateway 42 as means for transferring provisioning and maintenance work activity orders to the Level 1. The gateway 42 is a Video Information Services Terminal Access (VISTA) application that allows communications between Level 2 and Level 1.

To facilitate communications between Level 1 and the programmer providers, the Level 2s are provided with a listing of all the addresses passed by the Level 1 network. Included in this listing are the SLIDs for each address, the identifying number of the nearest upstream amplifier and the video status of each address (SLID). There are four video status used to describe each location: 1) Video Ready; 2) Video Capable; 3) No Video Drop; and 4) Not Available.

The Video Ready status indicates that the location is served by the network, an service control module has been placed in the service control housing, the coaxial drop is terminated at the service control unit and at the side of the building, and a signal level has been tested. This location can be remotely provisioned and does not require a dispatch for service order activity.

The Video Capable status indicates that the location is served by the network and that there is an service control housing ready to serve the location. The coaxial drop is in place but not terminated at the service control unit or at the location. This status requires a dispatch by Level 1 the first time the location becomes an active customer of a Level 2. The dispatch activity would consist of placing an service control unit in a housing, terminating the coaxial drop on the appropriate connection at the service control housing, placing a connector on the drop at the NIU and performing a signal level test.

The No Video Drop status indicates that the location is passed by the network and there is an service control housing in place ready to serve the location but a coaxial drop has not been placed between the service control housing and the residence or business. This situation may exist for a strip mall with a concrete apron surrounding the businesses and a low expectation of having video customers.

The Not Available status indicates that the location is not yet served by the distribution network and service cannot be provided at this time.

The assigned number of the nearest upstream amplifier for each address is provided as a means of identifying the location of a disruptive network condition and the locations effected. By providing an amplifier number along with notification of a network problem to the Level 2, they can determine which of the locations served by the network will be impacted. From this, the Level 2 can determine which of the locations impacted are their customers, and when receiving trouble reports from the customers, can provide service information while the customer is on line. This also enables the Level 2 to initiate credits for service disruption to video on demand or pay per view services before the bill generation.

The VISTA gateway 42 represents a SML and provides a data collection point for Open Network Architecture (ONA) data that is required by the FCC to prove Level 1 parity of service for Level 2s and provides the initial security layer between Level 1 and Level 2s. The VISTA gateway 42 also provides a common and consistent presentation view for the exchange of data between Level 1 and the Level 2s in the event Level 1 changes any of the support systems.

Provisioning orders are passed from the programmer providers through VISTA to the Customer Management System (CMS) 44. The CMS 44 represents a NML and manages the configuration and accounting management functions for the network and passes accounting data to a bill production unit 50. If a provisioning order is received and the subscriber location has a Video Ready video status, a message is sent from the CMS 44 to a Service Control Manager 46 to provision the desired analog channels. The Service Control Manager 46 represents an Elemental Manager that manages the many service control devices 48, such as interdiction units or set-top boxes. The Service Control Manger 46 communicates information to the service control devices 48 indicating which channels are to be sent to which business or residence 12 based on the provisioning order received for the subscriber location.

The service is then provisioned and the appropriate records are created in the CMS 44 to establish a relationship between the Level 2 and the end user subscriber to support a billing by the bill production unit 50 of the Level 2 by Level 1.

If the end user location is not Video Ready, a message is forwarded to a STAR (Service Tracking and Reporting) dispatch system 52, as manufactured and sold by Bellcore Corporation, which will schedule a technician dispatch to the location to install an interdiction unit or set-top box, connect the coaxial drop, and test the signal level. This effort can be scheduled prior to the Level 2 technician arriving at the location for installation of inside wiring or a set-top terminal.

The STAR dispatch system 52 assigns the work activity to the appropriate technician via a communications channel link 53 to a mobile unit 54, such as a technician truck. The communications channel link 53 comprises a first transceiver 55 disposed at the dispatch system 52 and a second transceiver 57 disposed on the mobile unit 54, and may be either a radio link or a cellular link. The truck 54 is equipped with a Mobile Data Terminal, Global Positioning System (GPS), and a cellular telephone. The Mobile Data Terminal is a personal computer that provides the technician with an electronic service activity order, thereby eliminating paperwork. The GPS system enables the technician to continuously monitor his/her location and forward this information to the dispatch system 52. The dispatch system 52 can then send the nearest technician to the location to be serviced.

The STAR dispatch system 52 also provides the integration of video and telephony services by dispatching both types of work order activities to the field technicians. A Key Board Work Entry (KWOE) module 56 manages the telephony orders, just as the CMS 44 does for video orders.

In addition to being a dispatch system, STAR 52 also functions as an integrator by processing network status messages from a Network Status Monitoring (NSM) system 58. The NSM 58 is an Elemental Manager that polls the network elements, e.g., optical receivers 60, optical transmitters 62, power source 64, and system amplifiers 66, and processes individual element status. Status information is displayed on a graphical user interface associated with the STAR system 52 and is made available to technical consultants for analysis. This activity allows for a controlled dispatch of a technician to a network location for resolution of a network problem that may result in multiple trouble reports from end user customers. The GPS system enables the selection of the closest technician to the source of the problem to be directed to the critical point in the network for the quickest resolution.

The architecture of the present invention provides a flow through, integrated service support operations architecture that supports rapid service delivery, a highly reliable service platform and reduced network and service operating expenses. The architecture of the present invention eliminates the involvement of service representatives and technicians in the service provisioning and maintenance process flows so that the introduction of errors normally associated with transcribing service data is eliminated, resulting in a high level of accuracy associated with the service activity. Thus, the architecture of the present invention enables a video dial tone provider or a CATV network provider to operate their service delivery capabilities for a multiplicity of content providers at a competitive advantage over a network provider with traditional, non-integrated system support.

While the best modes for carrying out the invention have been described in detail, those familiar with the art to which this invention relates will recognize various alternative designs and embodiments for practicing the invention as defined by the following claims.

What is claimed is:

1. A support system architecture for use in a communications network environment including a network provider and a plurality of programmer providers, the architecture enabling automatic provisioning and change in service at a plurality of subscriber locations comprising:

a gateway for allowing communication between the plurality of programmer providers and the network provider, the communication including one of a provisioning request requesting access to service from one of the programmer providers and a change in service request and further including remote service capability information for each of the plurality of subscriber locations;

a customer management system in communication with the gateway for receiving the communication from the gateway and for determining whether service at one of the plurality of subscriber locations can be remotely provisioned or changed based on the remote service capability information;

a service control manager in communication with the customer management system and the plurality of subscriber locations for automatically provisioning or changing the service of the one of the plurality of subscriber locations if the service of the one of the plurality of subscriber locations can be remotely provisioned or changed; and a dispatch system in communication with the customer management system for automatically scheduling work activity to provision the one of the plurality subscriber locations or to perform a change in service of the one of the plurality of subscriber locations if the service of the one of the plurality of subscriber locations cannot be remotely provisioned or changed.

2. The architecture as recited in claim 1 wherein the customer management system further automatically creates account information based on the one of the provisioning request and the change in service request.

3. The architecture as recited in claim 2 wherein the customer management system further automatically creates a first customer bill based on the account information.

4. The architecture as recited in claim 1 wherein the dispatch system includes a first transceiver and a plurality of mobile units each having a second transceiver, the first transceiver for generating a service signal for receipt by each of the second transceivers for initiating service at the one of the plurality of subscriber locations, and the plurality of mobile units for responding to the service signal.

5. The architecture as recited in claim 4 wherein the dispatch system further includes a global positioning system (GPS) enabling a selection of one of the plurality of mobile units to respond to the service signal based on the location of the one of the plurality of subscriber locations and the location of the plurality of mobile units.

6. The system architecture as recited in claim 1 wherein the dispatch system is a Service Tracking and Reporting (STAR) system.

7. A support system architecture for use in a communications network environment including a network provider, a plurality of programmer providers, and a plurality of subscriber locations, the architecture enabling automatic maintenance service at the plurality of subscriber locations comprising:

a network status monitoring system in communication with each of the plurality of subscriber locations for monitoring a performance status of the plurality of subscriber locations; and a dispatch system in communication with the network status monitoring system for automatically scheduling work activity to perform maintenance based on the performance status of the plurality of subscriber locations.

8. The architecture as recited in claim 7 wherein the dispatch system includes a first transceiver and a plurality of mobile units each having a second transceiver, the first transceiver for generating a service signal for receipt by each of the second transceivers for initiating service at the one of the plurality of subscriber locations, and the plurality of mobile units for responding to the service signal.

9. The architecture as recited in claim 8 wherein the dispatch system further includes a global positioning system (GPS) enabling a selection of one of the plurality of mobile units to respond to the service signal based on the location of the one of the plurality of subscriber locations and the location of the plurality of mobile units.

10. The architecture as recited in claim 7 wherein the dispatch system is a Service Tracking and Reporting (STAR) system.

11. The architecture as recited in claim 7 further comprising a customer management system in communication with the dispatch system for receiving a service signal from the dispatch system and for automatically creating a service record.

12. The architecture as recited in claim 11 wherein the customer management system further automatically creates a customer bill based on the service record.

13. The architecture as recited in claim 1 further comprising:

a network status monitoring system in communication with the plurality of subscriber locations and the dispatch system for monitoring a performance status of each of the subscriber locations and for automatically generating a work activity communication based on the performance status, and wherein the dispatch system is further provided for automatically scheduling work activity for performing maintenance in response to the work activity communication.

14. The architecture as recited in claim 13 wherein the customer management system is further provided for receiving a service signal from the dispatch system in response to the work activity communication for automatically creating a service record.

15. The architecture as recited in claim 14 wherein the customer management system is further provided for automatically creating a second customer bill based on the service record.

* * * * *